United States Patent [19]

Kawakami et al.

[11] Patent Number: 4,752,885
[45] Date of Patent: Jun. 21, 1988

[54] TOOL EXCHANGING APPARATUS WITH LENGTH OF TOOL COMPARISON

[75] Inventors: Ryuzi Kawakami; Katsumi Ito, both of Hiroshima, Japan

[73] Assignee: Mazda Motor Corporation, Hiroshima, Japan

[21] Appl. No.: 892,049

[22] Filed: Aug. 1, 1986

[30] Foreign Application Priority Data

Aug. 6, 1985 [JP]  Japan ................................ 60-172903

[51] Int. Cl.$^4$ .......................................... B23Q 3/155
[52] U.S. Cl. ...................................... 364/474; 29/568
[58] Field of Search ........................... 364/474; 29/568

[56] References Cited

U.S. PATENT DOCUMENTS

| 4,430,717 | 2/1984 | Senda et al. | 29/568 |
| 4,467,517 | 8/1984 | Kurata | 29/568 |
| 4,631,981 | 12/1986 | Kato et al. | 29/568 |
| 4,680,719 | 7/1987 | Kishi et al. | 364/474 |

FOREIGN PATENT DOCUMENTS

51-10387  3/1976  Japan .

*Primary Examiner*—Jerry Smith
*Assistant Examiner*—Allen MacDonald
*Attorney, Agent, or Firm*—Burns, Doane, Swecker & Mathis

[57] ABSTRACT

A machining center which processes a work piece by exchanging tools housed in a tool magazine with a tool mounted on a main spindle housing by means of the change arm of a change arm unit, which machining center comprises a main spindle housing forward-and-backward drive for moving the main spindle housing in forward and backward directions with respect to the work piece; a unit forward-and-backward drive for moving the change arm unit in the same direction as the direction in which the main spindle housing is moved forward and backward, a storage means for storing the length of the tool mounted on the main spindle housing; a comparing means for comparing the length of the tool mounted on the main spindle housing, read from the storage means, with the length of a tool which is to be mounted on the main spindle housing in exchange for said tool, and for determining which of said tools is longer; a computing means for computing a tool exchange position, in which position, the longer tool is as close to the work piece as practical without interfering with adjacent elements of the machining center at the time of the tool exchange; a first control means for controlling the main spindle housing forward-and rearward driving means so as to retract the main spindle to the tool exchange position after the work piece has been processed; and a second control device for controlling the unit forward-and-backward driving means such that the change arm unit, holding a tool which is to be exchanged with a tool mounted on the main spindle housing, is moved to the tool exchange position.

6 Claims, 7 Drawing Sheets

TOOL EXCHANGING APPARATUS WITH LENGTH OF TOOL COMPARISON

BACKGROUND OF THE INVENTION

1. Field of the Invention

The invention relates to a tool exchanging apparatus, equipped with a machining center, which shortens a tool exchange time period.

2. Description of the Prior Art

Since the economic situation has recently become serious, demand for increasing productivity has become strong. Therefore, it is very important to reduce processing time and to save energy.

Figure 6:
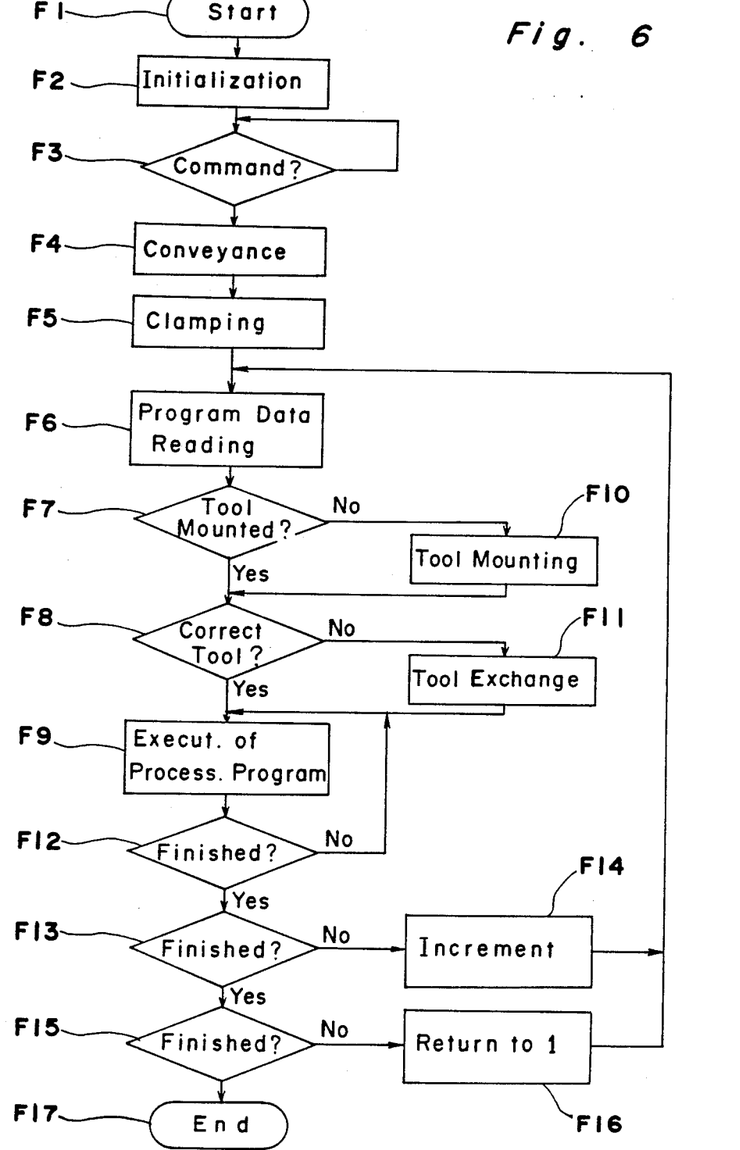
FIG. 6 is a flowchart of the control program used in a common machining center.

Machining centers have been developed in order to cope with this trend. Work pieces are processed by exchanging a tool mounted on a main spindle housing by means of a change arm unit in machining centers. Machining centers which process work pieces in such a manner are operated in accordance with the control program as shown in FIG. 6 of the accompanying drawings, reference to which will now be made for the detailed discussion.

When the power is applied to a machining center at step F1, the machine starts its operation. After a data is initialized at step F2 and an operation command is inputted at step F3, a work piece is conveyed into the machining center at step F4, and then clamped at step F5 to a table after it has been fixed to a jig. Thereafter, a program consisting of a series of processing steps is read at step F6 from the memory, and then, it is checked at step F7 to see whether or not a tool has been mounted on a main spindle housing. If it is detected at step F8 that the tool mounted on the main spindle housing is correct, the program consisting of a series of processing steps is executed at step F9. If no tool has been mounted on the main spindle housing, a tool is mounted at step F10 on the main spindle housing. If it is detected at step F8 that the tool is correct, the program consisting of a series of the processing steps is executed at step F9. If the tool mounted on the main spindle housing is wrong, the tool is replaced at step F11 with a correct tool, and then, the program consisting of a series of the processing steps is executed at step F9. When the program consisting of a series of the processing steps terminates at step F12, it is decided at step F13 whether or not every step of the series of the processing steps has been completed. If any of the steps of the processing steps has not been executed, the number of the processing step read from the memory is advanced by one at step F14, and the program returns to step F6 wherein the processing program data consisting of a series of the processing steps are read. Thereafter, the control program from step F6 to step F13 is run, at which step a decision is made to determine whether or not all of the processing steps have been executed is repeated. If it is judged that all of the processing steps have been executed, it is determined at step F15 whether or not all of the work pieces have been processed. If all of the work pieces have not been processed, a work piece exchange is made and the number of the processing step read from the memory is returned (F16) to one, and thereafter, the program returns to step F6 at which the processing program data consisting of a series of the processing steps are read. Thereafter, the control program from step F6 to step F15 at which it is determined whether or not all of the work pieces have been processed is repeated. If it is determined that all of the work pieces have been processed, the control program terminates at step F17.

Thus, in the machining center, once the work piece is positioned and subsequently fixed to a table by a jig, the work piece can be successively processed with different tools. Thus, owing to the mechanism, the time period for processing the work piece can be shortened and labor savings can also be achieved. Further, since various kinds of processings can be accomplished without moving the work piece, a processing line can be shortened.

Figure 7:
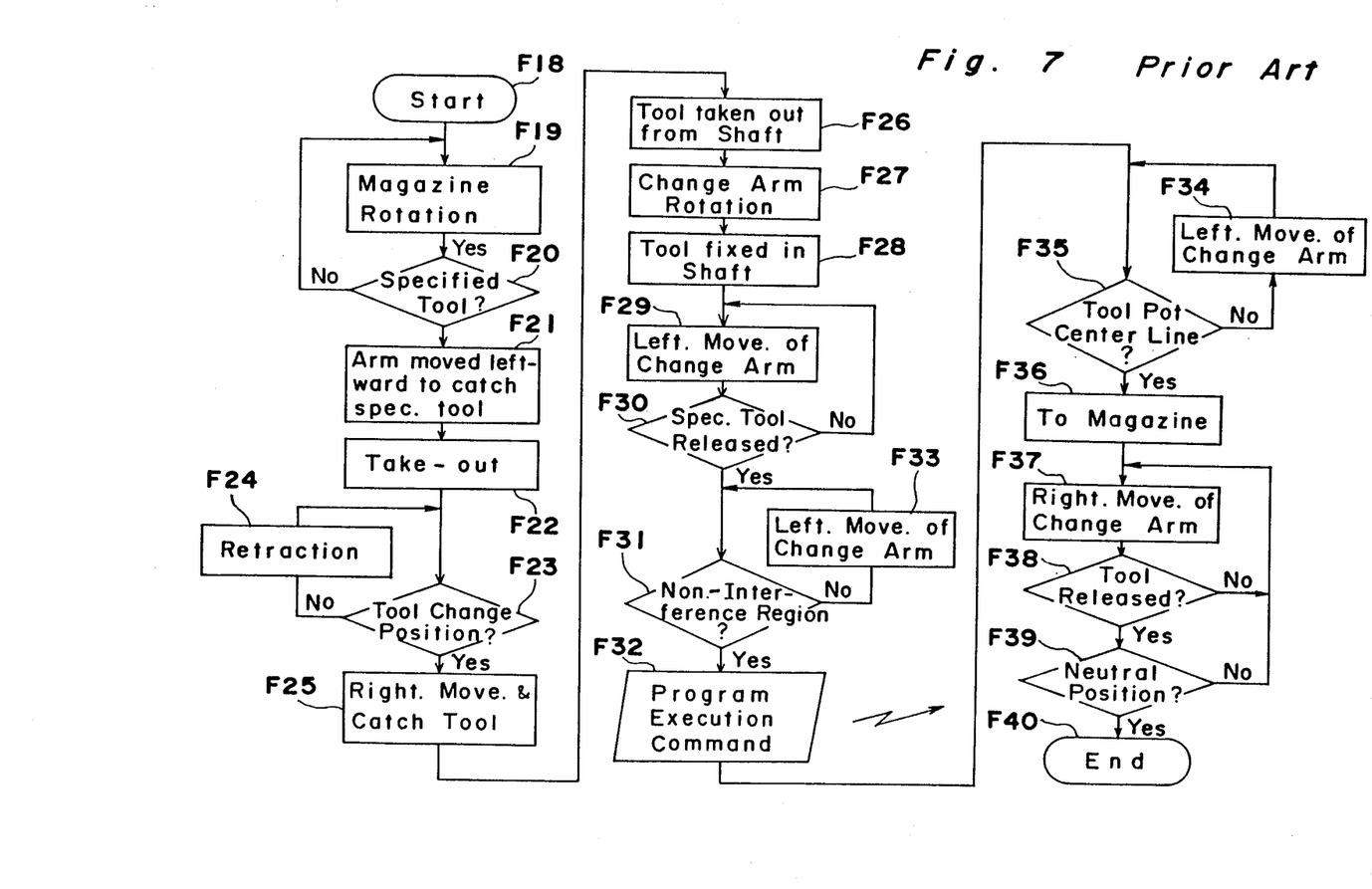
FIG. 7 is a flowchart of a tool exchange program used in the prior art machining center.

A conventional tool exchange method is accomplished in accordance with the tool exchange program as shown in FIG. 7. In detail, when a tool exchange program starts at step F18, a tool magazine which houses tools is rotated at step F19. The tool magazine continues to rotate until it is confirmed at step F20 that the tool (specified tool) used in the processing step has been rotated to the position where it is to be taken out. If it is detected that the specified tool has been rotated to the position where it is to be taken out, a change arm is moved in a direction (leftwards in this case) towards the tool magazine. The specified tool is caught by the change arm at one end thereof at step F21. Thereafter, a drive cylinder allows only the change arm to advance to take out the specified tool at step F22. Next, it is detected at step F23 whether or not the main spindle housing is positioned at the point where a tool on the main spindle housing is exchanged with the specified tool supported by the change arm. It is usual that, before this step F23 takes place, the main spindle housing has been moved from the position, where the work piece is positioned, back to the tool exchange position by a main spindle forward-and-backward driving unit. If the main spindle housing has not been retracted to the tool exchange position, the main spindle housing is retracted to the tool exchange position at step F24, and, after it has been confirmed at step F23 that the main spindle housing is on the tool exchange position, the change arm is moved toward the main spindle housing, namely, in a rightward direction, so that the tool on the main spindle housing is caught by the change arm at the other end thereof at step F25. Thereafter, the change arm is advanced from the tool exchange position to take the tool out of the main spindle housing at step F26, and then, is turned to position the specified tool in front of the main spindle housing at step F27, and next, retracted to the tool exchange position to fix the tool in the main spindle housing at step F28. Next, the change arm is moved toward the left at step F29 to release the tool from the change arm at step F30, and, at step F31 and after the change arm has reached the region where the change arm does not interfere with the main shaft, a command for starting the execution of the program of the process step is issued at step F32. Then the program for a series of processing steps is executed at step F9. The change arm continues a movement (at steps F33 and F34) toward the left until the tool taken out of the main spindle housing is positioned on the center line of the tool pot in the magazine. If it is detected at step F35 that the tool taken out of the main spindle housing is on the center line of the tool pot in the magazine, the magazine is advanced to house the tool therein at step F36. After the tool has been housed in the magazine, the change arm is moved at step F37 toward the right to release, at step F38, the tool housed in the magazine, and then, returns at step F39 to the neutral position where the change does not interfere with tools in the magazine as well as the main spindle housing. A tool exchange program terminates at step F40 when the change arm is returned to the neutral position.

The tool exchange apparatus of the above-described conventional machining center does not permit a change arm unit to move in the direction in which the main spindle housing moves. Therefore, the tool exchange position is set at a position backward from a work piece where the tool does not interfere with other members such as a work piece in the machining center when the tool, which is longest in the direction in which the main spindle housing moves forward and backward, is turned with the tool held by the change arm. Such a machining center has been disclosed in, for example, Japanese Patent Publication No. 10387/1976. In such a machining center, the main spindle housing is retracted to a tool exchange position distant from a work piece even when tools which are short, in the direction in which the main spindle housing moves forward and backward, are exchanged. This has caused the problem that the main spindle housing is ineffectively moved, and thus, time is wasted even when tools, which are short in the direction in which the main spindle housing moves forward and backward, are exchanged.

SUMMARY OF THE INVENTION

The invention has been made in view of the above-described problems. The invention intends to provide a tool exchange apparatus in a machining center which effectively moves a main spindle housing and shortens the time period required for exchanging tools.

The present invention relates to a tool exchange apparatus in a machining center which processes a work piece by exchanging tools, housed in a tool magazine, with a tool mounted on a main spindle housing by means of a change arm of a change arm unit. The apparatus comprises a main spindle housing forward-and-backward driving means for moving said main spindle in forward and backward directions with respect to the work piece; a unit forward-and-backward driving means for moving said change arm unit in the same direction as the direction in which said main spindle housing is moved forward and backward; a storage means for storing the length of the tool mounted on the main spindle housing; a comparing means for comparing the length of the tool mounted on the main spindle housing, read from the storage means, with the length of a tool which is to be mounted on the main spindle housing in exchange for said tool and for determining which of said tools is longer; and computing means for computing a tool exchange position, in which position, the longer tool is as close to the work piece as practical without interfering with adjacent elements of the machining center at the time of the tool exchange; a first control means for controlling the main spindle housing forward-and rearward driving means so as to retract the main spindle to the tool exchange position after the work piece has been processed; and a second control means for controlling said unit forward-and-backward driving means such that said change arm unit holding a tool which is to be exchanged with a tool mounted on said main spindle is moved to said tool exchange position.

BRIEF DESCRIPTION OF THE DRAWINGS

This and other objects and features of the invention will become clear from the following description taken in conjunction with a preferred embodiment thereof with reference to the accompanying drawings, in which:

FIG. 5, comprised of FIGS. 5(a) and 5(b), is a flowchart of a tool exchange program incorporated in an NC controller of the control circuit;

DETAILED DESCRIPTION OF THE EMBODIMENT

Referring now to FIGS. 1 to 5, main spindle housing 2 in a machining center 1 is supported on a column 3 for movement up and down. Column 3 is supported on base frame 4 for movement horizontally in Z-axis direction (vertical direction in FIGS. 1 and 2) through a slide frame 5 supported for movement horizontally in X-axis direction (lateral direction in FIGS. 1 and 2). Main shaft 2 can be moved up and down by a drive motor 6 mounted on an upper portion of column 3. Column 3 can be driven in Z-axis direction through guide rails 8 by a main spindle housing forward-and-backward driving means 7 composed of, for example, an alternating current servomotor mounted on a rear portion of slide frame 5. Slide frame 5 can be driven in X-axis direction through guide rails 9 by a slide frame driving means (not shown).

Figure 1:
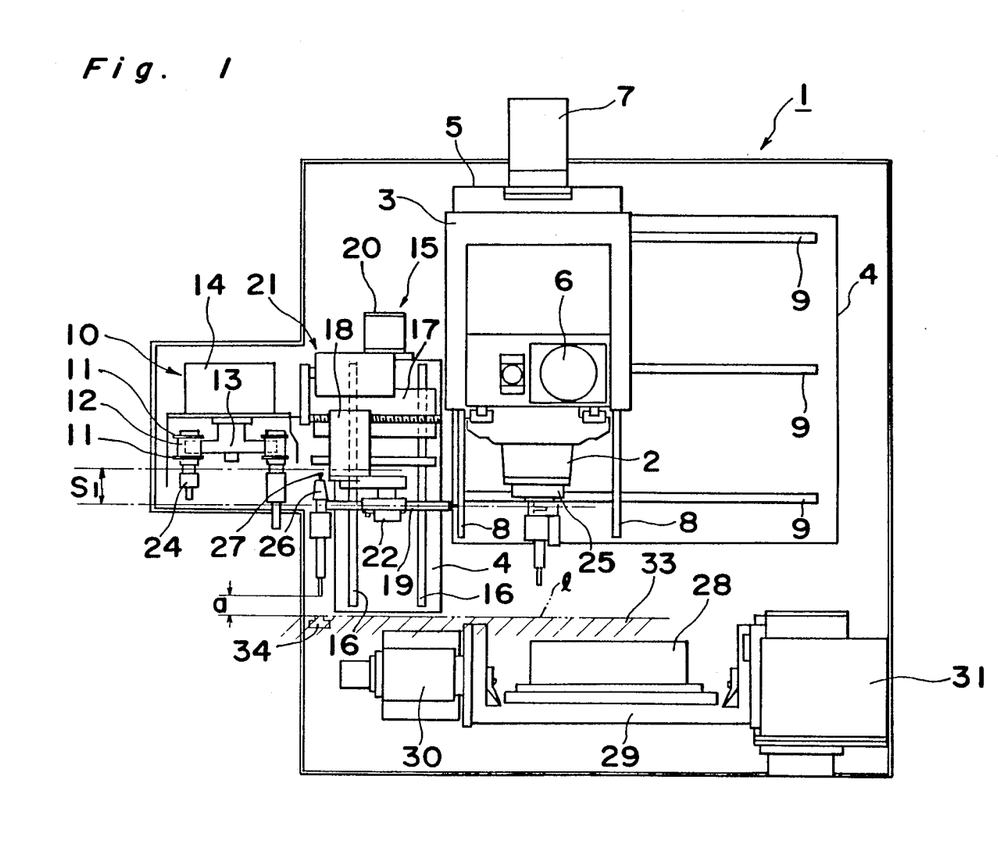
FIG. 1 is a plan view of a machining center according to an embodiment of the invention in which at least one of two tools to be exchanged is long.
Figure 2:
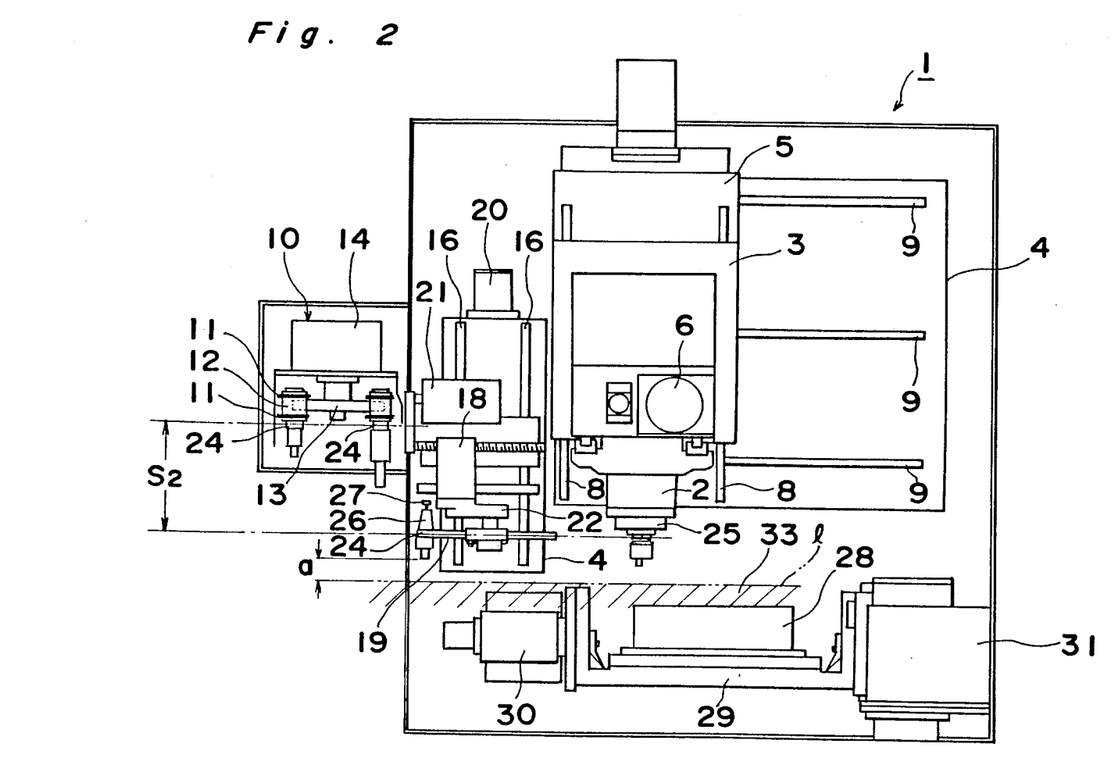
FIG. 2 is a plan view of a machining center according to an embodiment of the invention in which both tools to be exchanged are short.
Figure 3:
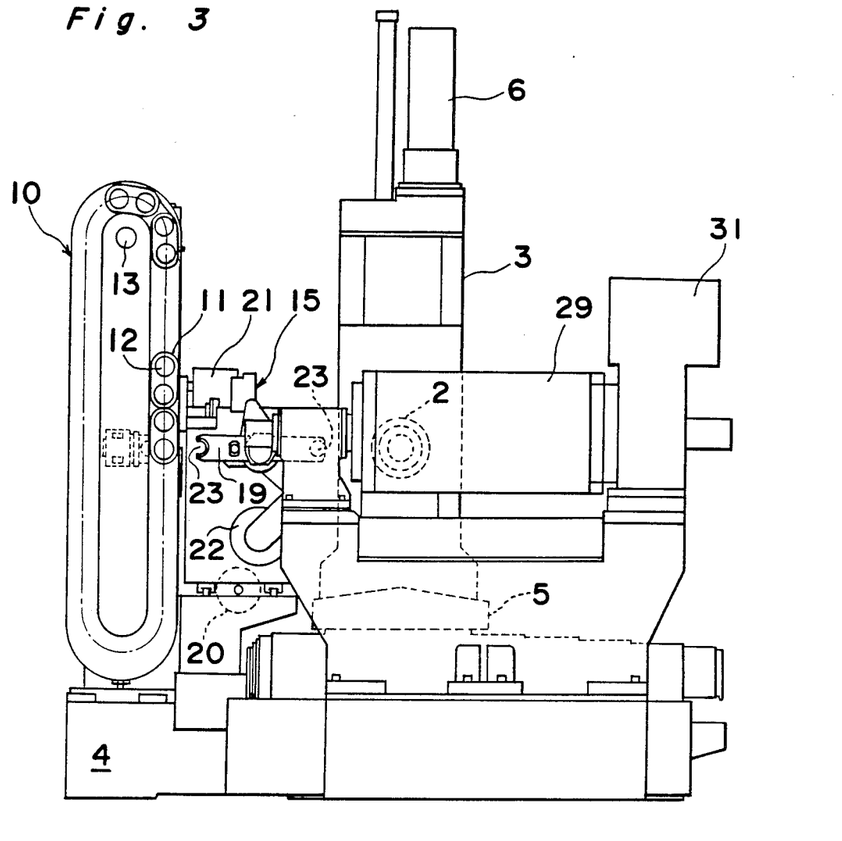
FIG. 3 is a front view of the machining center.
Figure 4:
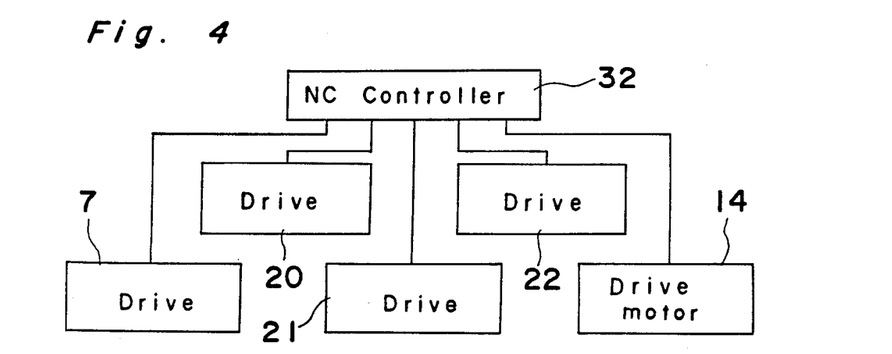
FIG. 4 is a block diagram of principal portions of the control circuit of the machining center.

Disposed on the left side of the main spindle housing 2 as viewed in FIGS. 1 and 2 is a tool magazine 10 which houses many tools. The tool magazine 10 includes many tool pots 12 connected to a chain by link plates 11 and a tool drive motor 14 which rotates tool pots 12 through a sprocket 13.

A change arm unit 15 is disposed between the tool magazine 10 and the main spindle housing 2 and column 3. Supported on the base frame 4 through guide rails 16 is a slide frame 17 which is horizontally movable in the Z-axis direction. Supported on the slide frame 17 is an arm supporting frame 18 which is horizontally movable in the X-axis direction. Supported at a front end of the arm supporting frame 18 is a change arm 19 which can be turned around on an axis in the Z-axis direction. The change arm unit 15 comprises the above-described slide frame 17, the arm supporting frame 18, and the change arm 19. The change arm unit 15 further comprises a unit forward-and-backward driving means 20 for driving slide frame 17, an arm lateral driving the means 21 for driving arm supporting frame 18, and an arm turning means 22 for driving the change arm 19.

Catching portions 23 of a crescent shape for catching tools are formed at opposite ends of the change arm 19. Tools have portions 24 which are fittingly caught by catching portions 23. A tapered bore (not shown) is formed inside the main spindle 25 formed in the main spindle housing 2. Formed at rear sides of the portions 24 of the tools are tapered portions 26 adapted to be fitted in the above-described tapered bore formed in the main spindle 25. Engaging convexes 27 are formed at the rear top portion of the tools. The main spindle 25 contains a tool-pull-stud (not shown) which selectively engages and disengages in and from the convexes 27 of a tool fitted therein.

Disposed in front (lower portions in FIGS. 1 and 2) of the main spindle housing 2 is a tilting jig 29 on which a work piece 28 is positioned and supported. The tilting jig 29 is supported by a tail stock 30 and a tilting table 31 disposed in the left and right sides thereof, respectively. The tilting table 31 can be rotated around an axis in the X-axis direction. The tilting jig 29 is rotated by rotation driving means (not shown) contained in the tilting table 31.

Figure 5A:
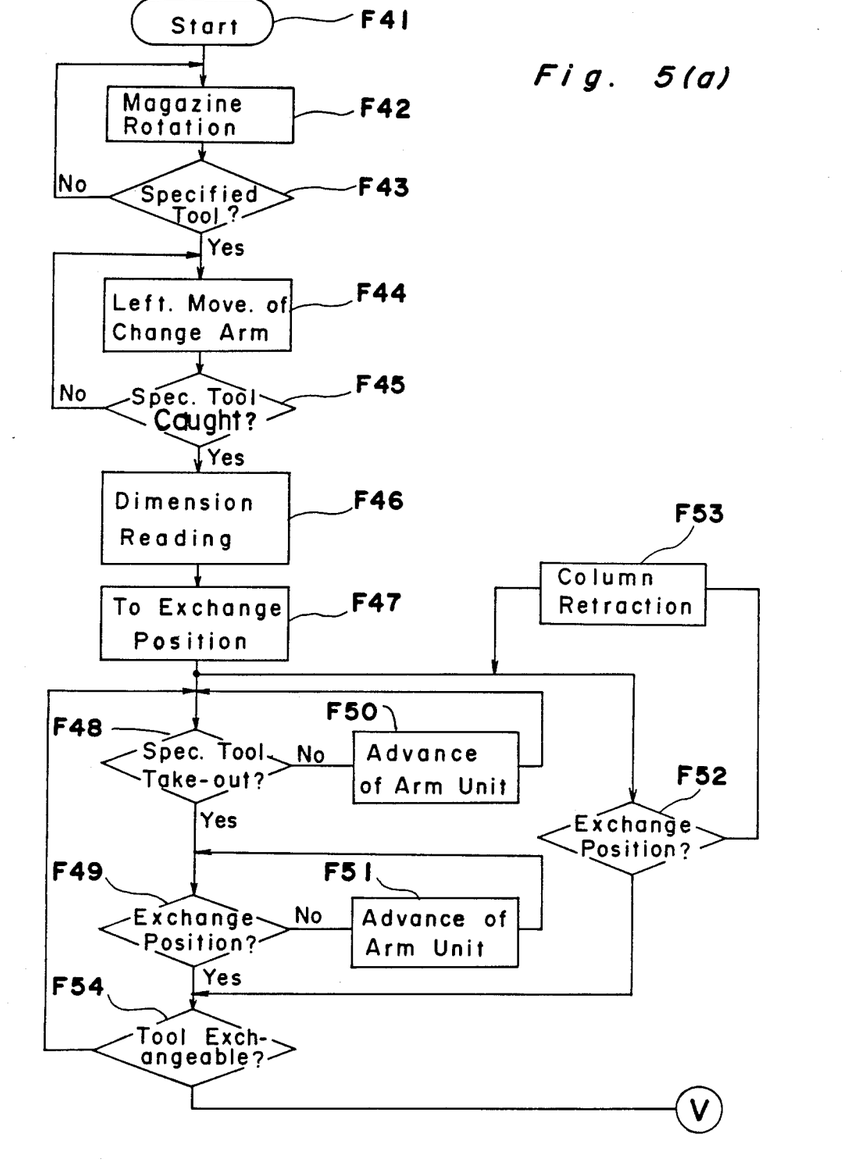
Figure 5B:
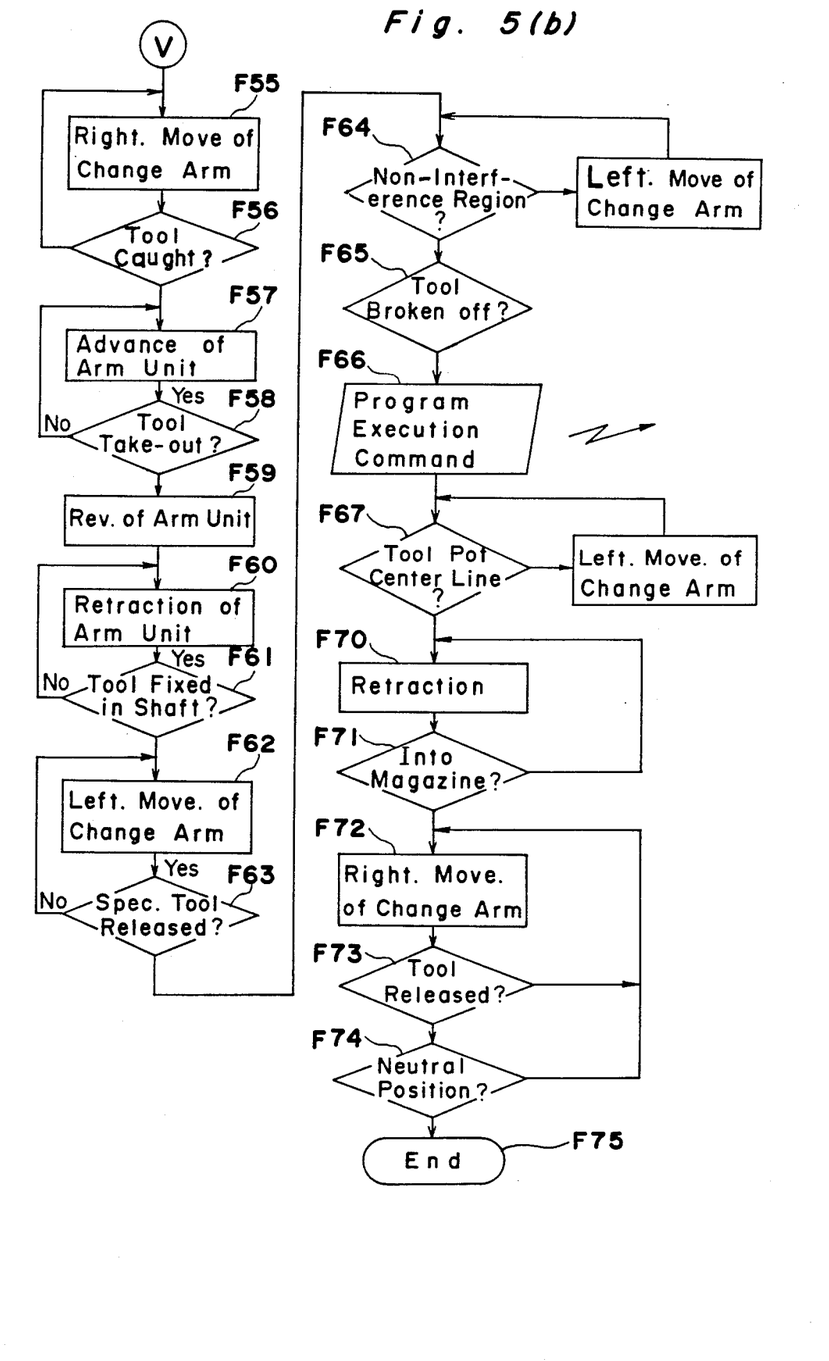

Actuators used in the machining center 1, namely, main spindle housing forward-and-backward driving means 7, tool driving motor 14, unit forward-and-backward driving means 20, arm lateral driving means 21, and arm turning driving means 22 are numerically controlled by a NC controller 32 according to a predetermined program. A tool exchange program as shown in the FIG. 5 is incorporated in NC controller 32.

An execution of a tool exchange program is started at step F41 by a tool exchange command. First, the tool driving motor 14 is actuated to rotate the tool pot 12 in the tool magazine 10 at step F42. When it is detected at step F43 that a tool (specified tool), which is to be used in a processing step which is to be executed, has been positioned at a predetermined take-out position, the tool driving motor 14 is stopped, and thereafter, the arm lateral driving means 21 is actuated to move the change arm 19 toward the left to catch the specified tool at step F44. When the portion 24 of the specified tool which is to be caught is caught by the left edge of catching portion 23 at step F45, the dimensions of this specified tool and those of the tool mounted on the main spindle housing 2 are read out at step F46 from the memory in the NC controller 32. The respective lengths of these tools are then compared, and the NC controller 32 calculates, at step F47, a work piece exchange position at which a top end of the longer tool will not interfere with other members such as the work piece 28, the tilting jig 29 and the tailstock 30 and at which position it is nearest to the work piece. The NC controller 32 also calculates the respective position in the Z-axis direction for the main spindle housing 2 and the change arm 19 at which the top end of the longer tool is positioned at a position spaced a distance "a" from an interfering region 33 (a hatched area below the line l as shown in FIGS. 1 and 2) within which region, interference with such other members takes place. In order to remove the tool from the main spindle housing 2, the change arm 19 must advance the distance "a". Next, it is detected at step F48 whether the specified tool has been taken out of the tool magazine 10. Until it is determined at step F49 that the change arm 19 has reached the above-described tool exchange position, the unit forward-and-backward driving means 20 is actuated to advance the change arm 19 forward at steps F50 and F51 until the change arm reaches the tool exchange position. After the work piece has been processed, it is determined at step F52 whether or not the main spindle housing 2 is at the above-described tool exchange position. The main spindle housing forward-and-backward driving means 7 is actuated until the main spindle housing 2 is positioned at the above-described tool exchange position, and then, column 3 and the main spindle housing 2 are moved backward at step F53. If it is detected at step F54 that column 3 and the main spindle housing 2 are at the tool exchange position and that a tool exchange can be accomplished, the arm lateral driving means 21 is actuated to move the change arm 19 toward the right at step F55. The change arm 19 may be moved toward the right if the change arm 19 does not interfere with the main spindle housing 2 as well as column 3 even while the main spindle housing 2 is moving backward. When portion 24 of a tool mounted on the main spindle housing 2 is caught at step F56 by the change arm 19 at the right edge thereof as a result of the movement of the change arm 19 toward the right, the engagement of the tool-pull-stud is cleared. Thereafter, the unit forward-and-backward driving means 20 is actuated to move the change arm 19 forward at step F57. When it is detected at step F58 that a tool has been taken out of the main spindle housing 2, the arm turning means 22 is actuated to turn the change arm 19 at step F59. Next, the unit forward-and-backward driving means 20 is actuated to move the change arm 19 backward at step F60. When it is detected at step F61 that the specified tool has been mounted on the main spindle housing 2, the arm lateral driving means 21 is actuated to move the change arm 19 toward the left at step F62, and then, the specified tool fitted in the main spindle housing 2 is released from the change arm 19 at step F63. Thereafter, the change arm 19 is moved at step F64 to a non-interference region where the change arm 19 does not interfere with the main spindle housing 2 and column 3 when the change arm 19 is moving in the Z-axis direction. At this point, at step F65 the tool break-off detecting means 34 checks whether or not the tool taken out of the main spindle housing 2 has been broken off. If the top end of the tool contacts with the tool break-off detecting means 34, it is judged that the tool has not been broken off and that a normal processing has been accomplished, and the subsequent tool exchange program continues. Contrary to this, if the top end of the tool does not contact the tool break-off detecting means 34, it is determined that the tool has been broken off and that a normal processing has not been accomplished, in which case the progress of the tool exchange program is stopped. At this point, an alarm warning is effected and the program of the process step is not executed. If it is detected at step F65 that the tool has not been broken off, a program execution command of the process step is issued at step F66 in the NC controller 32. The change arm 19 does not stop moving (at steps F68 and F69) toward the left until it is detected at step F67 that the tool taken out of the main spindle housing 2 has been positioned at the center line of the place to which the tool is returned. Next, the unit forward-and-backward driving means 20 is actuated to move the change arm 19 backward at step F70, and then, the tool is housed in the tool magazine 10 at step F71. Thereafter, the arm lateral driving means 21 is actuated to move the change arm 19 toward the right at step F72, and then, the tool housed in the tool magazine 10 is released from the change arm 19 at step F73. The tool exchange program terminates at step F75 when the change arm 19 is returned to the neutral position between the tool magazine 10 and column 3 at step F74.

In the above-described embodiment, the lengths of the two tools which are to be exchanged are compared in order to position the main spindle housing 2 in the region where the top end of the longer tool does not interfere with other members such as the work piece 28, tilting jig 29, and tail stock 30. After the work piece is processed, the main spindle housing 2 is moved back to the work piece exchange position where the main spindle housing 2 approaches nearest the work piece and the change arm unit 15 is moved forward to the tool exchange position. For example, if both tools are long as shown in FIG. 1, the amount of forward movement of the change arm unit 15 is $S_1$ which is relatively small. However, if both tools are short as shown in FIG. 2, the amount of forward movement of change arm unit 15 is $S_2$ which is greater than $S_1$, and as such, the amount of backward movement of main spindle housing 2 is small.

As described above, according to the invention, since the amount of the backward movement of a main spindle housing is set as small as possible according to the length of a tool being exchanged, the amount of the movement of the main spindle housing and the time period required for moving the main spindle housing can be minimized. Accordingly, the time period for processing a work piece in the machining center according to the invention is shorter than that required in conventional machining centers. Further, energy savings can be achieved.

Although the invention has been fully described in connection with the preferred embodiment thereof with reference to the accompanying drawings, it is to be noted that various changes and modifications are apparent to those skilled in the art. Such changes and modifications are to be understood as included within the scope of the invention as defined by the appended claims, unless they depart therefrom.

What is claimed is:

1. A machining center which processes a work piece by exchanging tools housed in a tool magazine with a tool mounted on a main spindle housing by means of a change arm of a change arm unit, which machining center comprises:

main spindle housing forward-and-backward driving means for moving said main spindle housing in forward and backward directions with respect to the work piece;

unit forward-and-backward driving means for moving said change arm unit in the same direction as the direction in which said main spindle housing is moved forward and backward;

storage means for storing the length of the tool mounted on the main spindle housing;

comparing means for comparing the length of the tool mounted on the main spindle housing, read from the storage means, with the length of a tool which is to be mounted on the main spindle housing in exchange for said tool and for determining which of said tools is longer;

computing means for computing a tool exchange position, in which position, the longer tool is as close to the work piece as practical without interfering with adjacent elements of the machining center at the time of the tool exchange;

first control means for controlling the main spindle housing forward-and rearward driving means so as to retract the main spindle to the tool exchange position after the work piece has been processed; and second control means for controlling said unit forward-and-backward driving means such that said change arm unit, holding a tool which is to be exchanged with a tool mounted on said main spindle housing, is moved to said tool exchange position.

2. The machining center as claimed in claim 1, wherein said main spindle housing is supported for movement up and down.

3. The machining center as claimed in claim 1, further comprising a base frame and a column mounted on the base frame for carrying the main spindle housing, said column being supported for movement horizontally.

4. The machining center as claimed in claim 3, further comprising a tool magazine accommodating a plurality of tools to be exchanged, said tool magazine is positioned laterally of the base frame.

5. The machining center as claimed in claim 1, wherein said change arm unit is movable left and right.

6. The machining center as claimed in claim 1, wherein said change arm is supported for turning movement.

* * * * *